Figure 1:
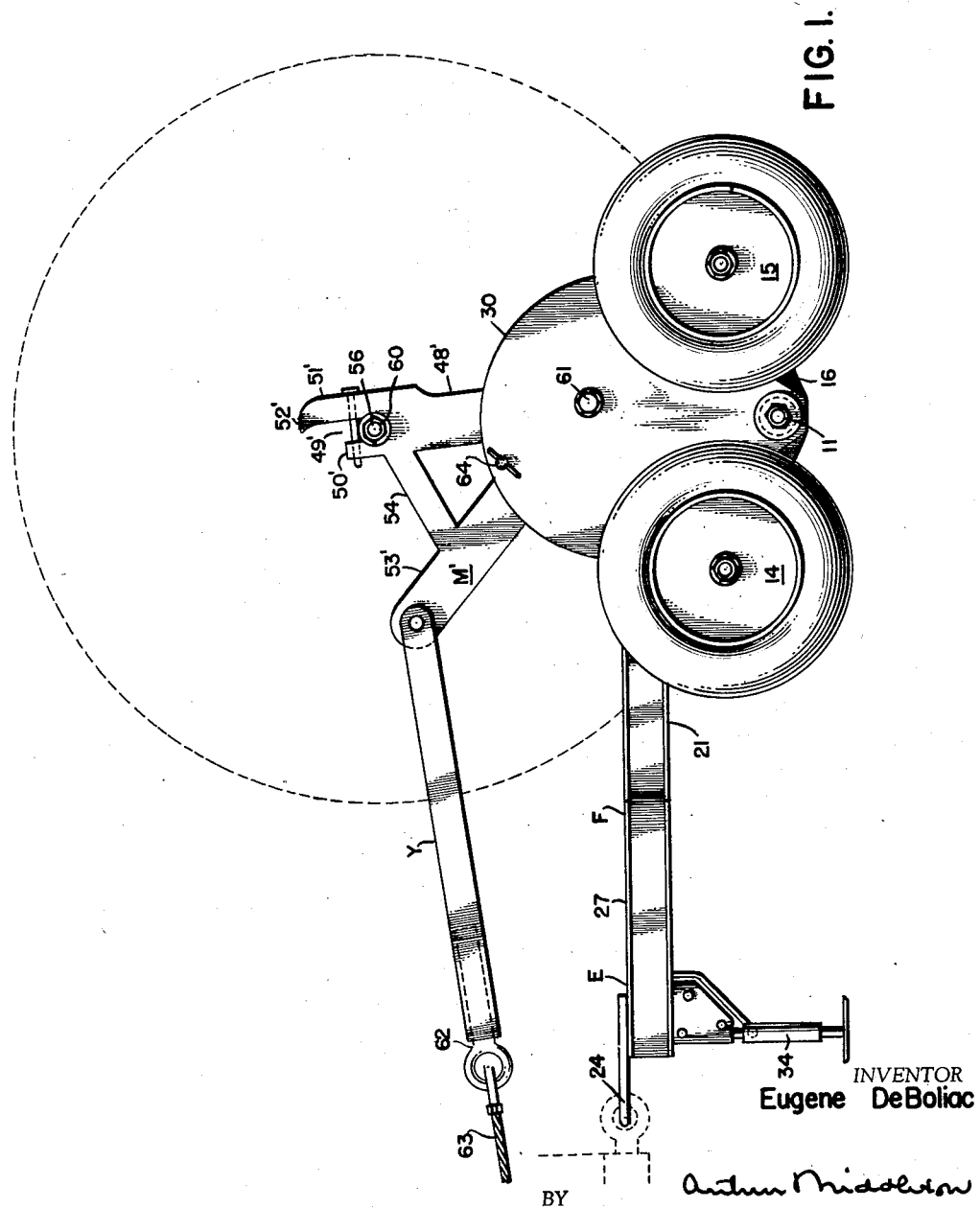

May 28, 1957 E. DE BOLIAC 2,793,773
CABLE REEL CARRIERS
Filed March 10, 1955 4 Sheets-Sheet 1

INVENTOR
Eugene DeBoliac
BY Arthur Middleton
ATTORNEY

May 28, 1957 E. DE BOLIAC 2,793,773
CABLE REEL CARRIERS
Filed March 10, 1955 4 Sheets-Sheet 4
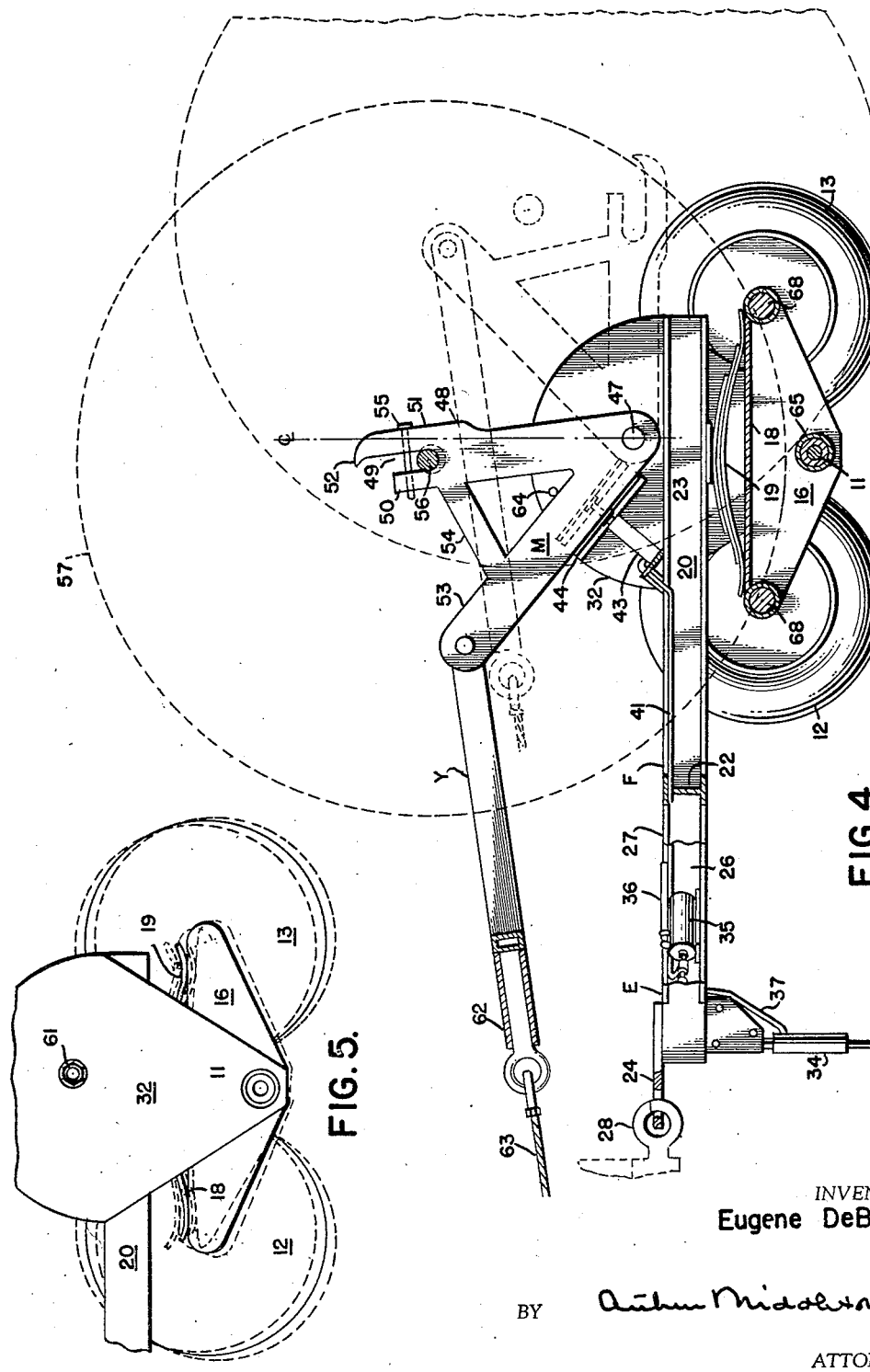
INVENTOR
Eugene DeBoliac
BY Arthur Middleton
ATTORNEY

United States Patent Office 2,793,773
Patented May 28, 1957

2,793,773

CABLE REEL CARRIERS

Eugene De Boliac, Miami, Fla.

Application March 10, 1955, Serial No. 493,424

3 Claims. (Cl. 214—390)

This invention relates to mobile carriers or transporters of spool-type cable reels that besides carrying the reel when the trailer is pulled by a motor-truck, can have certain of its parts tilted to raise the reel from the ground, and re-tilted to deposit the reel back on the ground, when the reel's journey has been completed. Heretofore, such carriers have been of the two-wheel tilt-type, but with the increase in size of cable reels, it becomes a problem to design such a carrier as a trailer that can handle these very much enlarged reels.

So it is an object of this invention to devise a trailer-carrier that is power-operated and can handle such reels weighing as much as 10 tons or more and measuring as much as 8 feet in diameter. Such reels present difficulties in lifting them from the ground onto the carrier and depositing them back onto the ground from the carrier, so another object of this invention is to devise a simple and dependable yet able reel-lifting mechanism for such carriers. Another object is to devise such a carrier that has a minimum of height, width and length. Another object is to devise such a carrier that has an extremely low center of gravity. Still another object is to devise such a carrier having a multi-wheeled body for dependably supporting the relatively great weight of a present-day reel. A further object is to mount the carrier on a group of wheels at each side of the carrier's body that the axles thereof can absorb both inequalities in the road and stresses created by loading and unloading of the reel.

These and other objects can be realized by a mobile carrier or trailer for a cable reel comprising two groups or pairs of wheels from which is supported a longitudinal frame provided with a draw-bar, and having means for raising and lowering the reel with respect to the ground including two upstanding but secured together generally triangular cradle members pivoted adjacent their apex and supported from the frame while being rockable through a path from one rearward extreme position from which the reel is engageable while on the ground to a forward extreme position in which the reel is supported from the carrier, while also including hydraulic means for moving the cradle members in their rearward movement, as well as power-operated means for moving those members through their forward path of movement. Additionally, each group or pair of wheels is laterally supported from a rockable connecting member pivotally mounted on an axle at an elevation beneath that of the centers of the wheels and also beneath the frame. These rockable members have a substantially flat top between which and the frame spring means are mounted for resiliently supporting the frame from the rockable members on which the pairs of wheels are journalled. Features of advantage flow not only from the foregoing construction but from other more detailed arrangements that are hereinafter described, particularly including construction of the bell-crank cradle members and the hydraulically operated stop element engageable by the bell-crank in its forward movement and reciprocable by the hydraulic means to initiate rearward movement of the bell-cranks when burdened with the cable reel.

Figure 2:
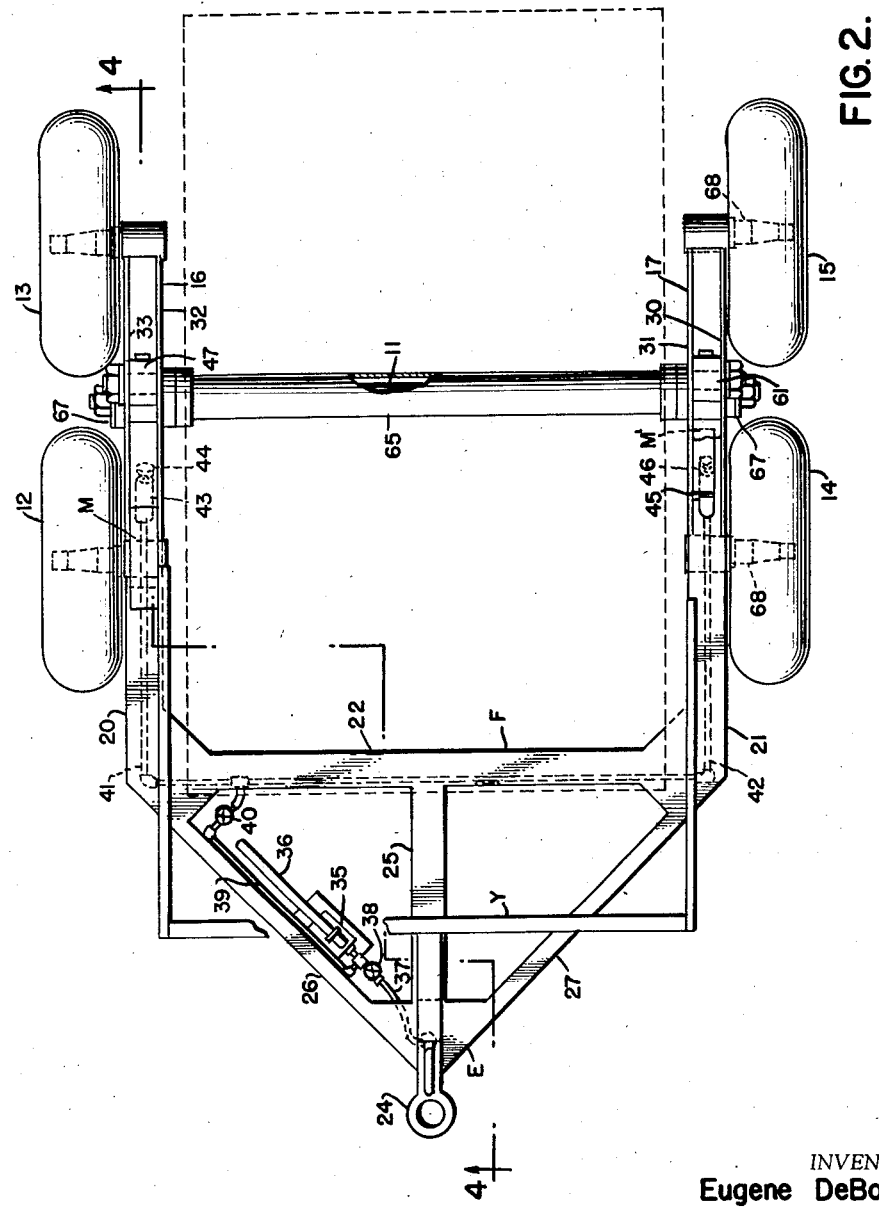
Figure 3:
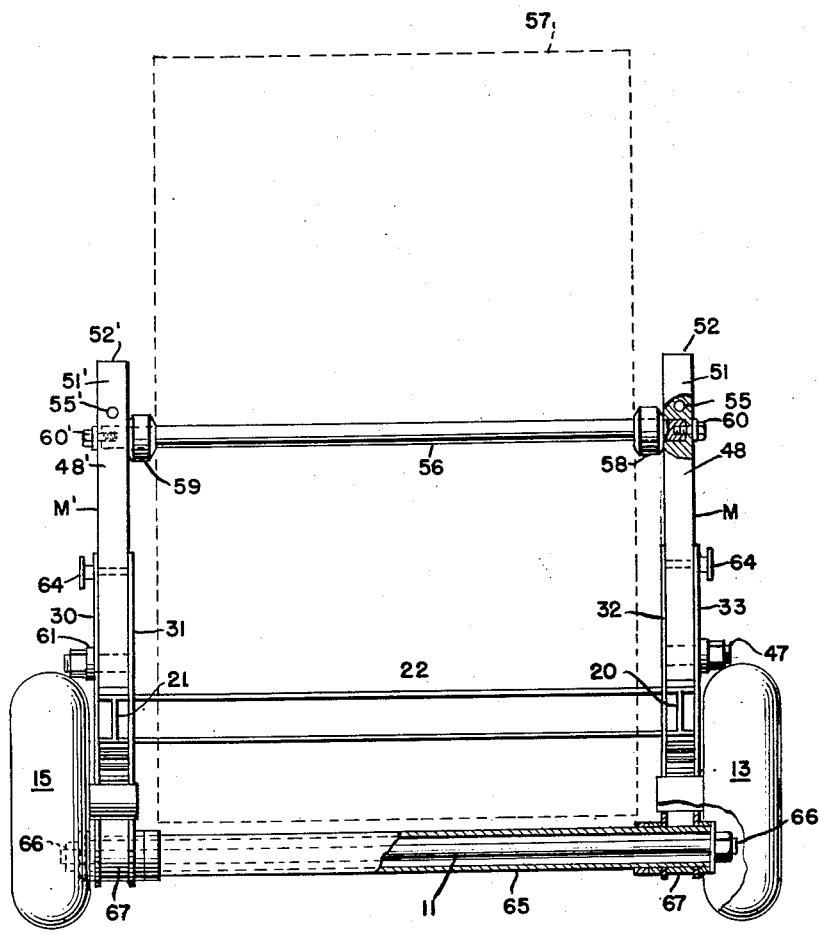

The best embodiment of my invention now known to me is illustrated in the accompanying drawings, in which Figure 1 shows a side elevational view of the new cable reel carrier; Fig. 2 shows a top plan view thereof; Fig. 3 shows a rear elevational view looking forward but with parts in section; Fig. 4 is a vertical sectional view taken along the line 4—4 in Fig. 2; while Fig. 5 is a detailed view showing a functional operation of the wheel mounting.

The mobile or trailer carrier, as can be seen in Fig. 2, has an axle 11 supported at each end from a group or pair of wheels 12 and 13 on one side and a group or pair of wheels 14 and 15 on the other side. The pair of wheels 12 and 13 are mounted in a walking-beam type of triangular wheel-connecting member 16 rockably mounted from the axle 11, while the other pair of wheels 14 and 15 are mounted on the same kind of a connecting member 17. Riding on the flat top 18 of each of the walking beam connecting members 16 and 17, is a leaf spring 19 whose function is to resiliently support the trailer frame F of the trailer that is yoke-shaped and made up of rearwardly extending side bars or legs 20 and 21 and front cross-bar 22. 23 represents a wear-plate on the legs engaged by the leaf springs. A drawbar eye 24 is provided at the apex of a triangular forward tongue-like extension E of the frame that is made up of a central longitudinal tongue member 25 which is intersected by two truss bars 26 and 27. The drawbar eye 24 is for attachment and detachment with the pintle hook 28 of a tractor.

Rising from the axle 11 on each side of the side bar or leg of the trailer frame F is a plate substantially of the shape shown, namely, curved at the top and pointed at the bottom. These plates are indicated by the numerals 30 and 31 for the plates on frame leg 21, and 32 and 33 for the plates on frame leg 20. Their function will be described later. The extension E of the main trailer frame F is supported forwardly thereof from the ground by a hydraulic jack 34, operable from a pump 35 motivated either by a power take-off or by a hand-lever 36 mounted in a suitable place such as on the truss bar 26 of the forward extension E on the trailer frame F. The hydraulic jack is connected with this pump by a pipe 37 controlled by a valve 38, so that the jack can be retracted or extended at the will of the operator. From the cylinder extends another pipe 39, controlled by a valve 40, which pipe then branches into two pipes 41 and 42. Pipe 41 leads to a hydraulically operated piston 42 supported from leg 20 of the trailer frame with which is connected a stopping and lifting shoe 44, while pipe 42 leads to a hydraulically operated piston 45 supported from leg 21 of the trailer frame with which is connected stopping and lifting shoe 46.

Pivoted on pivot pin 47, between side plates 32 and 33 rising from each side of leg 20 of the trailer frame F, is a rockable bell-crank cradle member M, A-shaped in design with a cradle rear arm 48 terminating in a recess 49 with a stub finger 50 on the forward side thereof and a claw-shaped finger 51 on the rearward side thereof with the claw-shaped finger terminating in a slight hook 52. The member M has another front arm 53 and a brace 54 between arms 48 and 53. A securing pin 55 passes through the fingers 50 and 51 to hold in place the spindle bar 56 of the reel 57. Pivoted at 58, between side plates 30 and 31 rising from each side of the leg 21 of the trailer frame F, is a triangular lifting member M' of similar construction to the member M, so its parts will be numbered the same as those of M, except that the parts are primed. The reel spindle bar 56 is inserted through the bore of the reel 57, and reel spacers 58 and 59 are positioned at each end of the spindle bar between the reel and the cradle members M and M'. 60 represents a spindle screw at each end of the spindle bar for preventing the cradle members M and M' from spreading. 61 represents the pivot pin of the other cradle member M', extending between the plates 30 and 31. Fastened to the ends of the arms 53 and 53' of the cradle members M and M', is a lifting yoke element Y that terminates forwardly in an eye-bar 62, that can be spring-biased if desired, securable to a winch line 63 operated from the tractor, that provides the power for pulling the rockable cradle members with their reel burden forwardly about their respective pivots 47 and 61 into the forward or reel-carrying position shown in Figs. 1 and 4. In this position these members are locked by means of securing pins such as 64, for fastening the respective members M and M' to the plates 32 and 33, and 30 and 31, respectively, between which they are located.

Returning for a moment to the axle 11: It is encased in a tubular housing 65, and is held in place by tie-rod 66, and the housing 65 has mounted on it at each end, boxes 67 that form the base of support, respectively, for the walking beam connecting members 16 and 17 to which the pairs of wheels are rotatably mounted on stub axles 68.

The reel-carrying trailer is designed to be used with a truck equipped with a winch mounted behind the cab and a pintle-type towing hook at the rear of the truck. The yoke shape of the trailer frame allows the trailer to straddle the reel when the trailer is backed toward it. The truck is backed up to within a few inches of the trailer drawbar eye 24 and the front of the trailer is raised through operation of the hydraulic jack 34 by motivation of the pump 35 forcing liquid through pipe 37 to the jack as controlled by valve 38. When the front of the trailer has been so raised until the drawbar eye is level with the opening of the pintle hook 28 on the truck, the trailer is coupled to the truck. The bell-crank cradle members M and M' are pivotally moved rearwardly to a position shown in phantom lines in Fig. 4. The truck winch line 63 is hooked onto the eye bar 62 of the reel-lifting yoke Y, and the trailer is then backed into the cable reel 57 until the rim of the reel rests against the trailer axle 11 (or rather its housing 65).

The reel spindle bar 56 is inserted through the bore in the reel and the reel spacers 58 are positioned on the spindle bar. Then the winch line is taken up until the recesses 49 and 49' of the respective cradle members M and M' engage the spindle bar. Next power is put on the winch line to pull the cradle members forwardly on their pivots, whereupon the reel if lifted up and over the axle until it assumes a position shown in Figs. 1 and 4 where the spindle bar of the reel attains a position past the center of balance, namely, forward of the transverse vertical plane intersecting the pivot pins 47 and 61 respectively of the cradle members. The arms 53 and 53' respectively, of the cradle members come to rest on the hydraulically operated shoes 44. In other words, the spindle bar in its recesses 49 and 49' is forwardly over the center line CL in Fig. 4. The cradle members are then secured in this position by the securing pins 64, and the trailer can then be towed since the reel is safely locked in position thereon, since the spindle pins 51 keep the spindle bar in its seat in the recesses 49 and 49' and the spindle screws 69 keep the cradle members M and M' from spreading. The claw-shaped fingers 51 and 51' terminating in hooks 52 and 52' are helpful in picking up and holding thereon the spindle bar of the reel.

To unload the reel, the winch line 63 is slacked off, whereupon the pump 35 is operated and valve 49 opened until as a result of the hydraulic pressure, the pistons 43 are extended which, in turn, push up their lifting shoes 44 as shown in dotted lines, until the weight of the reel is rearwardly past the center of balance. Meanwhile the winch line 63 is slowing reversed, lowering the reel to the ground by acting as a brake against the action of gravity.

When the trailer is being towed, the pairs of wheels on each side of the trailer, being journalled in the walking beam type of connecting member 16 can absorb road shocks and unequalities because that member pivots about the axle 11 that is at an elevation lower than the stub axles 68 of the wheels. The movement of the walking beam 16 is shown in Fig. 5, and also how the leaf spring supporting the frame of the trailer from the flat top of the walking beam can move to absorb road shocks.

The pair of side plates 30 and 31 are welded and bolted to the leg 21 of the trailer frame F, as shown in Figs. 2 and 3 and these plates support the reel-lifting members through their pivot pin 61. This pair of plates acts as a guide for the reel-lifting members and also as a guide for the walking beam member. The same is true of the pair of plates 32 and 33 on the other leg 20 of the frame F, namely, they also support the pivot pin 47, and act as a guide not only for the cradle members, but for the walking beam member 16. The leaf springs between the trailer frame and the walking beams 16 and 17 stabilizes the frame and prevent the walking beams from hitting the trailer frame. The tie rod 66 through the axle permits removal of the outside side plates 30 and 33, so the walking beams and the cradle members can be removed if necessary.

Whereas, the best embodiment of the invention now known to me has been described, it is to be understood that this is illustrative and not limiting, for obviously modifications in structure and in elements can be made without departing from the spirit and scope of the invention as defined in the following claims, because equivalents for parts and combinations thereof can be used so long as they are conjointly co-operatively equivalent to those claimed.

I claim:

1. A carrier for a cable reel comprising a mobile structure including a longitudinal frame, a draw-bar associated with said frame, means for raising and lowering a reel with respect to the ground including two upstanding cradle members having reel engaging portions at one end and being pivotally supported from the frame for rocking movement on a common axis from a reel engaging position on the ground to a reel transporting position on the carrier, a U-shaped frame having longitudinal side members and an integral cross connecting member connected to the opposite end of the side members, said U-shaped frame straddling the cradle members, means coupling the side members of the U-shaped frame with the cradle member in position to straddle a reel supported on the cradle members, said U-shaped frame tying the cradle members together for unitary movement on their pivots, flexible means for connecting the cross connection member of the U-shaped frame with a source of power for pivotally moving the cradle members through their forward path of movement to a point forwardly such that the axis of the reel is forwardly of the pivotal connection of the cradle to the frame, hydraulic means for moving the cradle members in their rearward path of movement.

2. The invention according to claim 1, wherein each of said cradle members comprises integral front and rear arms, with the rear arms having a recess for the reception of a reel carrying spindle bar, and means coupling the front arms to the side members of the U-shaped frame.

3. The invention according to claim 1, wherein said hydraulic means is positioned with respect to the cradle members to limit the forward movement of the cradle member after the said axis of the reel is forwardly of the pivotal connection of the cradle to the frame.

(References on following page)

References Cited in the file of this patent

UNITED STATES PATENTS

| | | |
|---|---|---|
| 1,864,676 | Smith et al. | June 28, 1932 |
| 1,921,233 | Kuchar | Aug. 8, 1933 |
| 1,949,481 | Koller | Mar. 6, 1934 |
| 2,433,598 | Chadwick | Dec. 30, 1947 |
| 2,481,891 | Van Raden | Sept. 13, 1949 |
| 2,581,087 | Eakin | Jan. 1, 1952 |

FOREIGN PATENTS

| | | |
|---|---|---|
| 491,558 | Great Britain | Sept. 2, 1938 |